US011473947B2

(12) United States Patent
Druzhkov et al.

(10) Patent No.: US 11,473,947 B2
(45) Date of Patent: Oct. 18, 2022

(54) DUAL SENSOR VORTEX FLOWMETER (71) Applicant: MICRO MOTION, INC., Boulder, CO (US)

(72) Inventors: Aleksandr Mikhailovich Druzhkov, Chelyabinsk (RU); Andrey Vasilyevich Babenkov, Chelyabinsk (RU); Anton Alexeyevich Chernovol, Chelyabinsk (RU)

(73) Assignee: MICRO MOTION, INC., Boulder, CO (US)

( * ) Notice: Subject to any disclaimer, the term of this patent is extended or adjusted under 35 U.S.C. 154(b) by 375 days.

(21) Appl. No.: 16/610,646

(22) PCT Filed: Dec. 24, 2018

(86) PCT No.: PCT/RU2018/000853
§ 371 (c)(1),
(2) Date: Nov. 4, 2019

(87) PCT Pub. No.: WO2020/139097
PCT Pub. Date: Jul. 2, 2020

(65) Prior Publication Data
US 2020/0333172 A1 Oct. 22, 2020

(51) Int. Cl.
*G01F 1/325* (2022.01)
*G01F 7/00* (2006.01)

(52) U.S. Cl.
CPC .......... *G01F 1/3282* (2022.01); *G01F 1/3266* (2022.01); *G01F 7/00* (2013.01)

(58) Field of Classification Search
CPC ......... G01F 7/00; G01F 1/3266; G01F 1/3282
See application file for complete search history.

(56) References Cited

U.S. PATENT DOCUMENTS

| 4,448,081 A | 5/1984 | Kolitsch et al. |
| 4,565,098 A | 1/1986 | Herzl |
| (Continued) | | |

FOREIGN PATENT DOCUMENTS

| CN | 2624182 Y | 7/2004 |
| CN | 1672016 A | 9/2005 |
| (Continued) | | |

OTHER PUBLICATIONS

Notification of Transmittal of the International Search Report and the Written Opinion of the International Searching Authority from International Application No. PCT/RU2018/000853, dated Sep. 26, 2019.

(Continued)

*Primary Examiner* — Paul M. West
(74) *Attorney, Agent, or Firm* — Westman, Champlin & Koehler, P.A.

(57) ABSTRACT

A vortex flowmeter includes a housing having an interior cavity, a vortex shedder supported by the housing and extending into the interior cavity, an ultrasonic sensor, a bending moment sensor and a controller. The ultrasonic sensor is configured to produce an ultrasonic flow rate output that is indicative of the flow rate of a fluid flow through the interior cavity. The bending moment sensor is configured to produce a bending moment flow rate output that is indicative of the flow rate of the fluid flow through the interior cavity. The controller is configured to generate a flow rate measurement that is indicative of the flow rate based on the ultrasonic flow rate output and/or the bending moment flow rate output.

21 Claims, 3 Drawing Sheets (56) References Cited

U.S. PATENT DOCUMENTS

| | | | |
|---|---|---|---|
| 6,615,673 | B1 | 9/2003 | Cullie |
| 7,580,801 | B2 | 8/2009 | Unsworth et al. |
| 8,069,734 | B2 | 12/2011 | Oda et al. |
| 10,416,009 | B1 * | 9/2019 | Miller .................. G01F 15/185 |
| 2003/0167836 | A1 | 9/2003 | Mattar |
| 2006/0217899 | A1 | 9/2006 | Unsworth et al. |
| 2009/0301219 | A1 | 12/2009 | Oda et al. |

FOREIGN PATENT DOCUMENTS

| | | | |
|---|---|---|---|
| CN | 101467008 | A | 6/2009 |
| CN | 201463938 | U | 5/2010 |
| CN | 102183274 | | 9/2011 |
| CN | 102183274 | A * | 9/2011 |
| CN | 202083417 | U | 12/2011 |
| JP | 2001082987 | A | 3/2001 |

OTHER PUBLICATIONS

Office Action, from Chinese Patent Application No. 201880053894.7, dated Aug. 25, 2021.
Communication pursuant to Rules 161(1) and 162 EPC, from European Patent Application No. 18900571.3, dated Jul. 2, 2021.
Rejection Notice from Japanese Application No. 2021-536379, dated Aug. 3, 2022.

* cited by examiner

DUAL SENSOR VORTEX FLOWMETER

CROSS-REFERENCE TO RELATED APPLICATION

This Application is a Section 371 National Stage Application of International Application No. PCT/RU2018/000853, filed Dec. 24, 2018, not yet published, the contents of which are hereby incorporated by reference in their entirety.

BACKGROUND

Embodiments of the present disclosure relate to industrial fluid flow measurement systems and, more particularly, to a dual sensor vortex flowmeter that provides a fluid flow velocity measurement based on one or both of the sensors.

Vortex flowmeters are used in the industrial process control field for directly measuring the flow rate of a fluid through a conduit. Vortex flowmeters are typically inserted into the pipe or conduit that carries the fluid to be measured. The operating principle of a vortex flowmeter is based on the phenomenon of vortex shedding known as the Von Karman street effect. As fluid passes a bluff body or vortex shedder, small eddies or vortices are shed alternately along and behind each side of the vortex shedder at a shedding frequency, which is proportional to the velocity of the fluid flow. The vortex flowmeter utilizes a sensor to detect the vortices and determine the shedding frequency. The vortex flowmeter can then output a velocity measurement based on the determined shedding frequency.

Vortex flowmeters may use different types of sensors to detect the vortices shed from the vortex shedder. Some vortex flowmeters utilize a bending moment sensor, which is also known as a "flapper," to determine the velocity of a fluid flow. The bending moment includes a strain gauge that may be coupled to the vortex shedder or to a beam that is positioned downstream of the vortex shedder. During a fluid flow measurement, the alternating shed vortices from the vortex shedder generate alternating patterns of high and low pressure on each side of the vortex shedder or the beam. This causes an oscillating strain the vortex shedder or beam at a frequency that matches the shedding frequency. The vortex flowmeter uses the strain gauge to detect the oscillating strain pattern and determine the shedding frequency, from which the velocity of the fluid flow is determined.

Vortex flowmeters may also use an ultrasonic sensor to detect the shedding frequency. Ultrasonic sensors include an emitter and a receiver that are positioned on opposing sides of the fluid flow downstream from the vortex shedder. The emitter transmits ultrasonic waves through the shed vortices that are detected by the receiver. The vortices create localized oscillatory variations in observable flow parameters such as pressure or velocity. When the ultrasonic waves are transmitted through the vortices, the vortices produce a phase difference between the transmitted wave and the wave received by the receiver, which is dependent upon the strength and velocity of the vortices. The detected phase differences are utilized by the flowmeter to calculate the velocity of the fluid flow.

SUMMARY

Embodiments of the present disclosure are generally directed to vortex flowmeter and methods of using the vortex flowmeter to measure a flow rate of a fluid flow. One embodiment of the vortex flowmeter includes a housing having an interior cavity, a vortex shedder supported by the housing and extending into the interior cavity along a first axis that is oblique to a central axis of the cavity, an ultrasonic sensor, a bending moment sensor, and a controller. The ultrasonic sensor is supported by the housing on a downstream side of the vortex shedder, and is configured to produce an ultrasonic flow rate output that is indicative of the flow rate of a fluid flow through the interior cavity. The ultrasonic sensor includes an ultrasonic emitter and an ultrasonic receiver that are positioned on opposing sides of the interior cavity. The bending moment sensor is supported by the housing on the downstream side of the vortex shedder, and is configured to produce a bending moment flow rate output that is indicative of the flow rate of the fluid flow through the interior cavity. The bending moment sensor includes a beam extending from a wall of the interior cavity along the first axis. The controller is configured to generate a flow rate measurement that is indicative of the flow rate based on the ultrasonic flow rate output and/or the bending moment flow rate output.

One embodiment of the method of measuring a flow rate of a fluid flow using a vortex flowmeter includes positioning a vortex shedder of the vortex flowmeter in the fluid flow. When the flow rate is less than a first threshold flow rate, a low flow mode measurement of the flow rate is performed using an ultrasonic flow rate output produced by an ultrasonic sensor of the vortex flowmeter. When the flow rate is greater than a second threshold flow rate, which is greater than the first threshold flow rate, a high flow mode measurement of the flow rate is performed using a bending moment flow rate output produced by a bending moment sensor of the vortex flowmeter. When the flow rate is between the first and second threshold flow rates, a medium flow mode measurement of the flow rate is performed using the ultrasonic flow rate output and the bending moment flow rate output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may be embodied in many different forms and should not be construed as limited to the particular embodiments set forth herein. Rather, these embodiments are provided so that this disclosure will be thorough and complete, and will fully convey the scope of the present disclosure to those skilled in the art.

Figure 1:
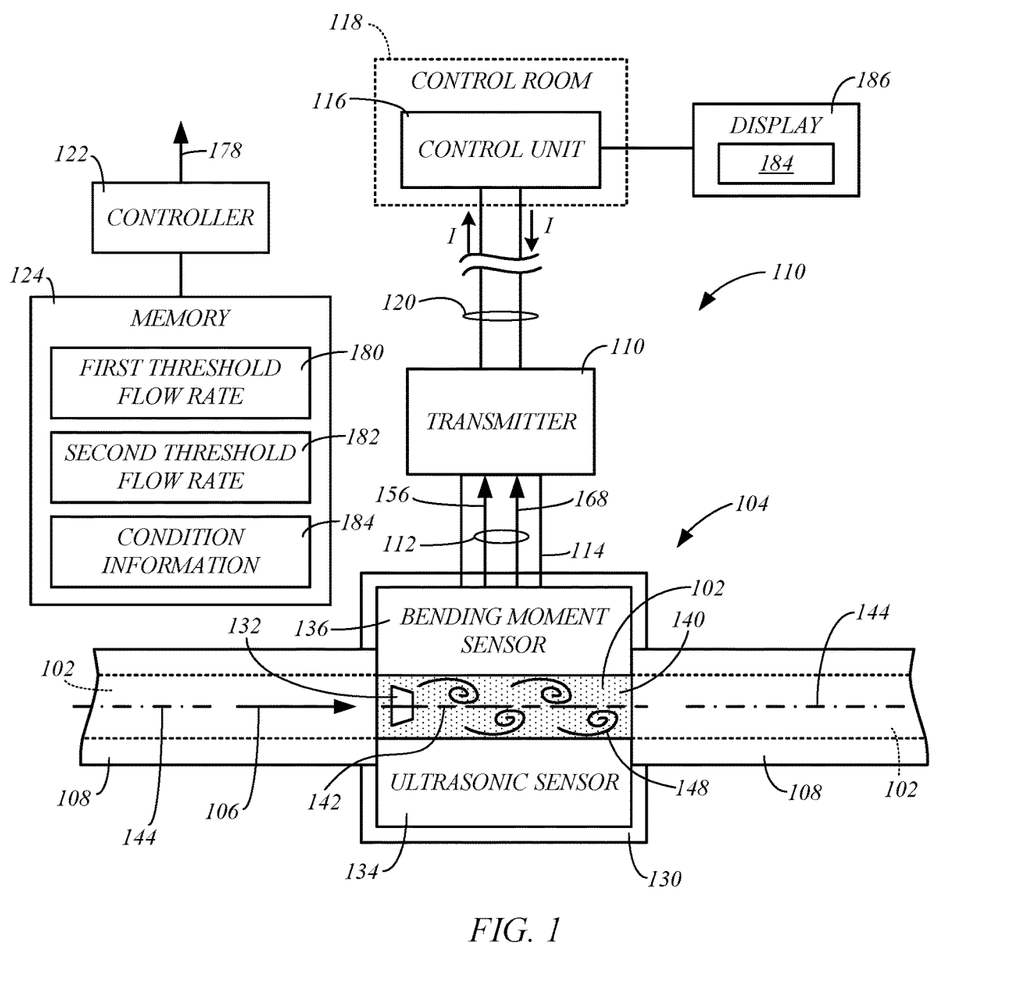
FIG. 1 is a simplified diagram of an exemplary industrial process measurement system, in accordance with embodiments of the present disclosure.

FIG. 1 is a simplified diagram of exemplary industrial process measurement system 100, in accordance with embodiments of the present disclosure. The system 100 may be used in the processing of a process fluid 102, such as a liquid or a gas, to transform the process fluid 102 from a less valuable state into more valuable and useful products, such as petroleum, chemicals, paper, food, etc. For example, an oil refinery performs industrial processes that can process crude oil into gasoline, fuel oil, and other petrochemicals.

The system 100 includes a vortex flowmeter 104 in accordance with embodiments of the present disclosure. The vortex flowmeter 104 is configured to estimate or measure a velocity or flow rate of a flow 106 of the process fluid 102 through a pipe 108, or another process vessel, of the system 100. The flow rate measurement estimated by the flowmeter 104 may be used to determine volumetric and mass flow rates of the process fluid 102 using conventional techniques based on parameters of the pipe 108, such as its cross-sectional area, and parameters of the process fluid 102, such as its temperature, pressure and/or density.

In some embodiments, the system 100 includes a transmitter 110 that is configured to receive flow rate information 112 from the vortex flowmeter 104 over a suitable wired or wireless communication link 114. The transmitter 110 is also configured to transmit the flow rate information 112 to a control unit 116 (e.g., computing device), which may be remotely located from the transmitter 110 in a control room 118, for example, as shown in FIG. 1. The control unit 116 may be communicatively coupled to the transmitter 110 over a suitable physical communication link, such as a two-wire control loop 120, or a wireless communication link. Communications between the control unit 116 and the transmitter 110 may be performed over the control loop 120 in accordance with conventional analog and/or digital communication protocols.

In some embodiments, the control loop 120 includes a 4-20 milliamp control loop, over which the flow rate information 114 may be represented by a level of a loop current I flowing through the control loop 120, in accordance with a conventional analog communication protocol. Exemplary digital communication protocols include the modulation of digital signals onto the analog current level of the two-wire control loop 120, such as in accordance with the HART® communication standard. Other purely digital techniques may also be employed including FieldBus and Profibus communication protocols.

The transmitter 110 may also be configured to communicate wirelessly with the control unit 116 using a conventional wireless communication protocol. For example, the transmitter 110 may be configured to implement a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the transmitter 110 and the vortex flowmeter 104 from any suitable power source. For example, the transmitter 110 and/or the vortex flowmeter 104 may be wholly powered by the current I flowing through the control loop 120. One or more power supplies may also be utilized to power the transmitter 110 and the vortex flowmeter 104, such as an internal or an external battery. An electrical power generator (e.g., solar panel, a wind power generator, etc.) may also be used to power the transmitter 110 or the vortex flowmeter 104, or charge a power supply used by the devices.

A controller 122 may represent multiple controllers of the system 100, such controllers of the vortex flowmeter 104, the transmitter 110, and the control unit 116, for example. The controller 122 includes one or more processors (i.e., microprocessor, central processing unit, etc.) that perform one or more functions described herein in response to the execution of instructions, which may be stored locally in non-transitory computer readable media or memory 124. The memory 124 may represent memory of the control unit 116, memory of the transmitter 110, and/or memory of the vortex flowmeter 104.

In some embodiments, the processors of the controller 122 are components of one or more computer-based systems, such as the control unit 116. The controller 122 may include one or more control circuits, microprocessor-based engine control systems, one or more programmable hardware components, such as a field programmable gate array (FPGA), that are used to control components of the monitoring system 100 and/or perform one or more functions described herein. The controller 122 may also represent other conventional circuitry of the transmitter 110, the flowmeter 104 and the control unit 116. Accordingly, the controller 122 may represent components of the vortex flowmeter 104, the transmitter 110, and/or the control unit 116, such as data processing components, data communications components, and/or other components, for example.

Figure 2:
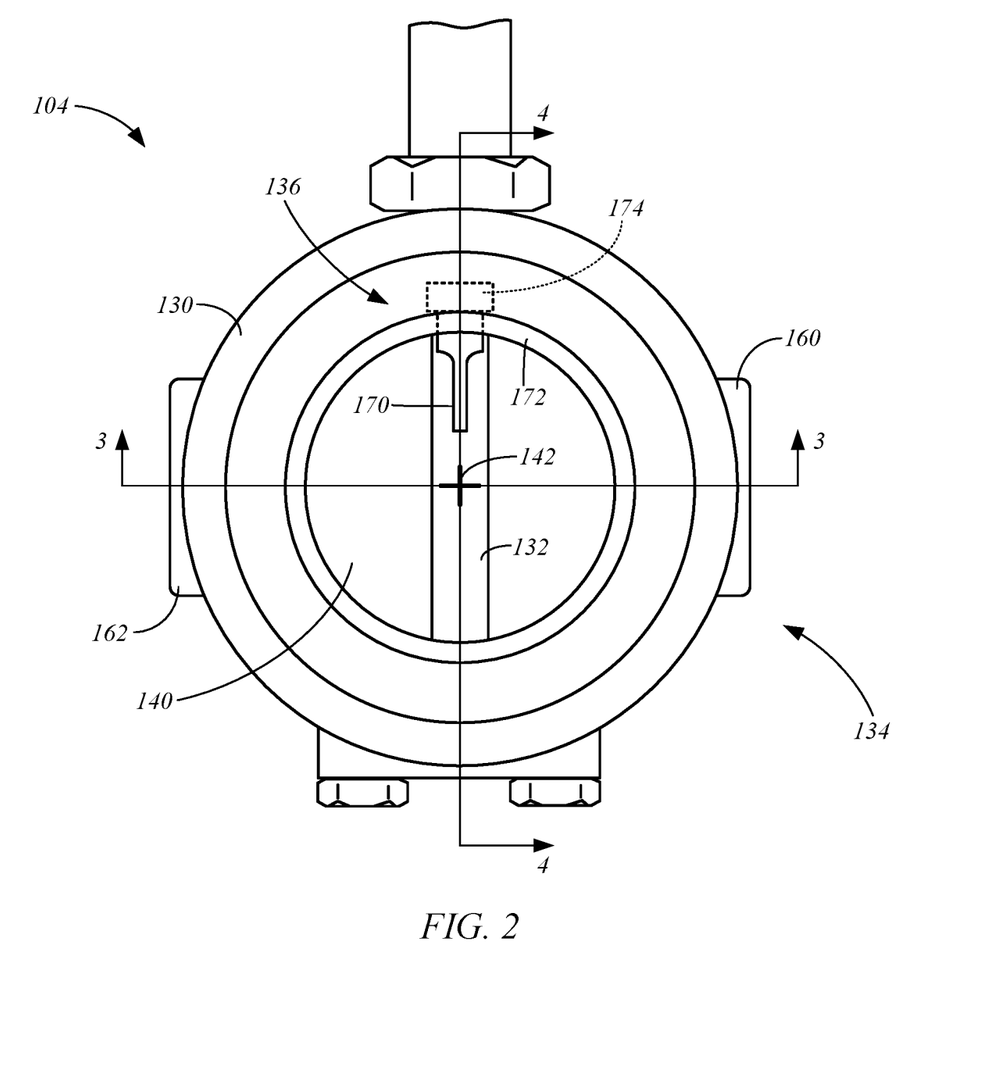
FIG. 2 is a simplified front view of an exemplary vortex flowmeter, in accordance with embodiments of the present disclosure.
Figure 3:
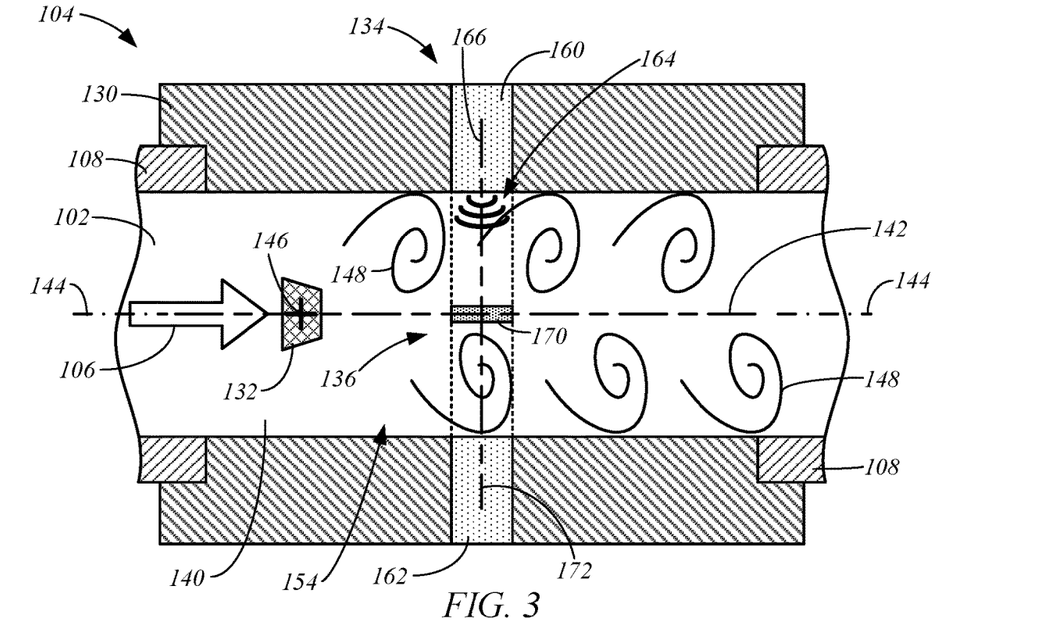
FIGS. 3 and 4 are top and side cross-sectional views of the exemplary vortex flowmeter of FIG. 2 taken generally along lines 3-3 and 4-4, respectively, in accordance with embodiments of the present disclosure.
Figure 4:
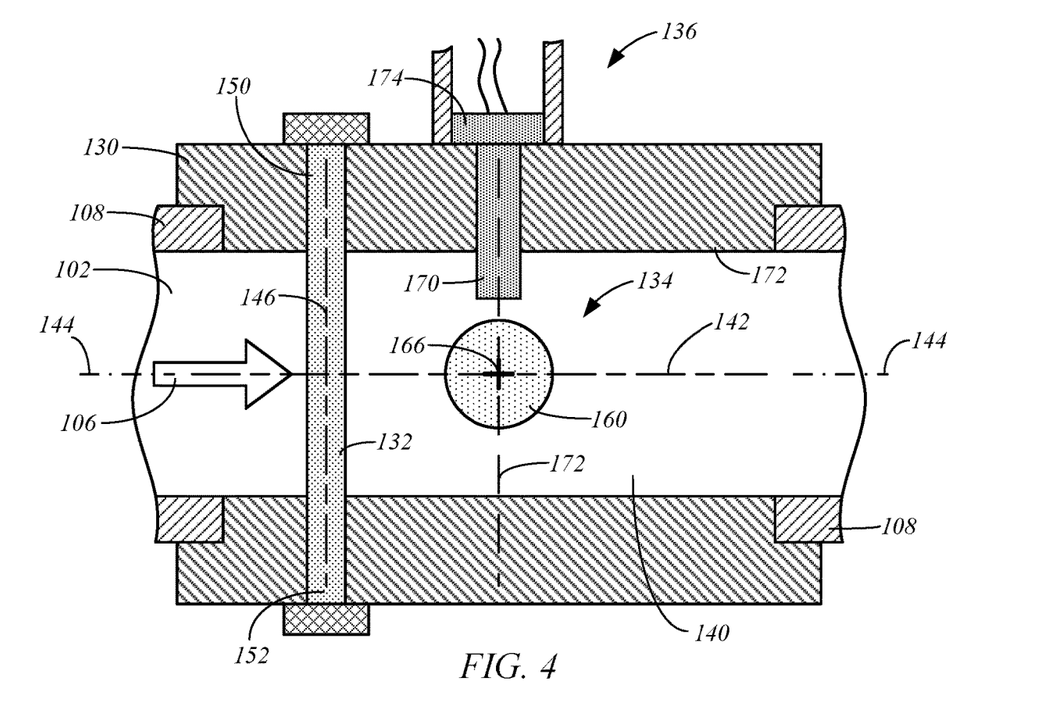

FIG. 2 is a simplified front view along the central axis 142 of an exemplary vortex flowmeter 104 in accordance with embodiments of the present disclosure. FIGS. 3 and 4 respectively are top and side cross-sectional views of the exemplary vortex flowmeter 104 of FIG. 2 taken generally along lines 3-3 and 4-4, in accordance with embodiments of the present disclosure.

Some embodiments of the vortex flowmeter 104 include a housing 130, a vortex shedder 132, an ultrasonic sensor 134, and a bending moment sensor 136, as shown in FIG. 1. As discussed below in greater detail, the dual sensor configuration of the vortex flowmeter 104 provides advantages over conventional vortex flowmeters that utilize only a single sensor, such as either a bending moment sensor or an ultrasonic sensor, for example.

The housing 130 includes an interior cavity 140, such as a tubular interior cavity, having a central axis 142. The housing 130 may be connected in line with the pipe 108, such that the central axis 142 is substantially coaxial to a central axis 144 of the pipe 108, as shown in FIG. 1.

The vortex shedder 132 is supported by the housing 130 and extends into the interior cavity 140 along an axis 146 that is oblique to the central axis 142, as shown in FIG. 4. In some embodiments, the vortex shedder 132 has a conventional cross-sectional shape that is configured to shed vortices 148 in response to the fluid flow 106, as shown in FIGS. 1 and 3. In one exemplary embodiment, the vortex shedder 132 has a trapezoidal cross-sectional shape, as shown in FIG. 3. The vortex shedder 132 may extend through the center of the cavity 140, such that the axis 146 intersects the axis 142, as shown in FIG. 4. In some embodiments, each end 150 and 152 of the vortex shedder 132 is attached to the housing 130. Alternatively, the vortex shedder 132 may be secured to the housing at only one of the ends 150 or 152.

The ultrasonic sensor 134 may take on any suitable form. In some embodiments, the ultrasonic sensor 134 is supported by the housing 130 on a downstream side 154 of the vortex shedder 132 relative to the fluid flow 106, as shown in FIGS. 3 and 4. The ultrasonic sensor 134 is configured to produce an ultrasonic flow rate output 156 (FIG. 1) that is indicative of the flow rate of the fluid flow 106 through the interior cavity 140.

The ultrasonic sensor 134 includes an emitter 160 and a receiver 162 that are supported by the housing 130 on opposing sides of the interior cavity 140, as shown in FIG. 3. The emitter 160 is configured to transmit ultrasonic waves 164 (FIG. 3) through the vortices 148, which are received by the receiver 162. The ultrasonic waves 164 undergo a phase shift relative to their transmitted form due to interference with the vortices 148. Thus, the waves 164 received by the receiver 162 have a phase difference relative to their transmitted form. The flow rate output 156 output by the ultrasonic sensor 134 may indicate this phase difference, which varies over time due to the passing vortices 148. The varying output 156 may be used by the controller 122 to determine the shedding frequency and the flow rate of the fluid flow 106, in accordance with conventional techniques.

The emitter 160 and the receiver 162 may be aligned along an axis 166. In some embodiments, the axis 166 extends through the central axis 142 of the cavity 140. In some embodiments, the axis 166 extends obliquely to the axis 146 and the central axis 142, and extends through the central axis 142, the emitter 160 and the receiver 162, as indicated in FIGS. 3 and 4.

The bending moment sensor 136 may take on any suitable form. In some embodiments, the bending moment sensor 136 is supported by the housing 130 on the downstream side 154 from the vortex shedder 132, as shown in FIGS. 3 and 4. In some embodiments, the bending moment sensor 136 is configured to produce a bending moment flow rate output 168 (FIG. 1) that is indicative of the flow rate of the fluid flow 106 through the interior cavity 140.

In some embodiments, the bending moment sensor 136 includes a beam 170 that extends from a wall 172 of the housing 130 into the interior cavity 140 along a plane 172, which may be substantially parallel to the axis 146, as shown in FIG. 4. In some embodiments, the beam 170 is displaced from the central axis 142, as shown in FIG. 4. In some embodiments, the plane 172 extends obliquely to the central axis 142 and through the beam 170, the ultrasonic emitter 160 and the ultrasonic receiver 162, as shown in FIGS. 3 and 4.

The bending moment sensor 136 may also include a strain or torque gauge 174 that is used to sense a strain or torque on the beam 170, in accordance with conventional bending moment sensors. The output 168 from the gauge 174 may be used by the controller 122 to detect the shedding frequency of the vortices 148 and estimate the flow rate of the fluid flow 106, in accordance with conventional techniques.

In one alternative embodiment, the bending moment sensor 136 may utilize the vortex shedder 132 in place of the beam. Here, the strain or torque gauge 174 is used to measure strain or torque on the vortex shedder 132. The output 168 from the gauge 174 is then used by the controller 122 to detect the shedding frequency of the vortices 148 and the flow rate of the fluid flow 106, in accordance with conventional techniques.

Components of the controller 122 may be used to generate a flow rate measurement 178 that is indicative of the flow rate of the fluid flow 106 based on the ultrasonic flow rate output 156 and/or the bending moment flow rate output 168. Thus, the vortex flowmeter may be described as including the controller 122, which generally means that components of the controller 122 that generate the flow rate measurement 178, for example, may be components of the vortex flowmeter 104 (e.g., supported by the housing), components of the transmitter 110, and/or components of the control unit 116.

In some embodiments, the vortex flowmeter 104 includes a low flow mode, a medium flow mode, and a high flow mode. The vortex flowmeter 104 operates in the low flow mode when the flow rate of the fluid flow 106 is less than a first threshold flow rate 180, which may be stored in the memory 124. The flowmeter 104 operates in the medium flow rate when the flow rate of the fluid flow 106 is between the first threshold flow rate 180 and a second threshold flow rate 182, which is greater than the first threshold flow rate. The second threshold flow rate 182 may be stored in the memory, as shown in FIG. 1, or another suitable location. The vortex flowmeter 104 operates in the high flow mode when the flow rate of the fluid flow 106 is greater than the second threshold flow rate 182.

The first and second threshold flow rates 180 and 182 may be set by a user of the flowmeter and stored in the memory. The first and second threshold flowrates 180 and 182 are set based on the anticipated flow conditions and the diameter of the pipe 108. In some embodiments, the first threshold flow rate 180 may be less than 30 $m^3$/hour and the second threshold flow rate 182 may be greater than 80 $m^3$/hour In one exemplary embodiment, such as for pipes having an inner diameter of 3 inches (DN80 mm), the first threshold flow rate 180 may be set to 10 $m^3$/hour or less and the second threshold flow rate 182 may be set to 100 $m^3$/hour or greater. Thus, according to this example, the vortex flowmeter 104 operates in the low flow mode for flow rates of around 0-10 $m^3$/h, the vortex flowmeter 104 operates in the medium flow mode for flow rates of around 10-100 $m^3$/h, and the vortex flowmeter 104 operates in the high flow mode for flow rates above around 100 $m^3$/h. Other threshold flow rates may be used for different pipe diameters and conditions.

The flow rate ranges corresponding to the low flow mode, the medium flow mode and the high flow mode, are selected to take advantages of the properties of the ultrasonic sensor 134 and the bending moment sensor 136. In general, the controller 122 utilizes the flow rate output 156 from the ultrasonic sensor 134 when the flow rate is one that the ultrasonic sensor 134 is expected to provide a reliable flow rate output 156, and the controller 122 does not utilize the flow rate output 156 from the ultrasonic sensor 134 when the flow rate of the fluid flow 106 is one that the ultrasonic sensor 134 is expected to provide a less reliable flow rate output 156 relative to the flow rate output 168 of the bending moment sensor 136. Likewise, the controller 122 utilizes the flow rate output 168 from the bending moment sensor 136 when the flow rate of the fluid flow 106 is one that the bending moment sensor 136 is expected to provide a reliable flow rate output 168, and the controller 122 does not utilize the flow rate output 168 from the bending moment sensor 136 when the flow rate is one that the bending moment sensor 136 is expected to provide a less reliable flow rate output 168 relative to the flow rate output 156 produced by the ultrasonic sensor 134.

Some advantages to the ultrasonic sensor 134 include a high sensitivity, which makes the sensor 134 useful in measuring very low fluid flow rates. Additionally, pipe vibration does not significantly affect the accuracy of flow rate measurements performed by the ultrasonic sensor 134. However, the ability of the ultrasonic sensor 134 to accurately measure a flow rate may be adversely affected by entrained gas within the liquid flow 106. Additionally, even low levels of cavitation in the flow 106 can adversely affect flow rate measurements using the ultrasonic sensor 134.

Some advantages to the bending moment sensor 136 include the ability to provide relatively accurate flow rate measurements of liquid flows 106 having a low concentration of undissolved gas, and the ability to provide relatively accurate flow rate measurements in the presence of a low level of cavitation in the flow 106. However, the bending moment sensor 136 may not be sufficiently sensitive to measure low flow rates. Additionally, vibrations of the pipe 108 may adversely affect the accuracy of a flow rate measurement using the bending moment sensor 136.

The first threshold flow rate is generally selected to define a relatively low level flow rate range for the fluid flow 106, in which the bending moment flow rate output 168 is not as reliable as the ultrasonic flow rate output 156. Additionally, at such low flow rates, the bending moment sensor 136 is highly sensitive to vibration of the pipe 108, which could cause the bending moment flow rate output 168 to be less reliable than the ultrasonic flow rate output 156. However, at flow rates that are less than the first threshold flow rate 180, the ultrasonic flow rate output 156 is relatively reliable. Accordingly, the controller 122 only uses the ultrasonic flow rate output 156 when determining the flow rate measurement of the fluid flow 106 when the vortex flowmeter 104 is in the low flow mode, and does not use the bending moment flow rate output 168.

When the flow rate of the fluid flow 106 is between the first and second threshold flow rates 180 and 182, the vortex flowmeter 104 operates in the medium flow mode, and the flow rate measurement 178 generated by the controller 122 is based on both the ultrasonic flow rate output 156 and the bending moment flow rate output 168. Here, both the ultrasonic sensor 134 and the bending moment sensor 136 produce flow rate outputs 156 and 168 that are substantially reliable for the flow rate range between the first and second threshold flow rates 180 and 182. In some embodiments, the controller 122 may use the average of the flow rates indicated by the ultrasonic flow rate output 156 and the bending moment flow rate output 168 as the flow rate measurement 178.

In some embodiments, when the vortex flowmeter 104 is operating in the high flow mode, the controller 122 generates the flow rate measurement 178 based on only the bending moment flow rate output 168 and not on the ultrasonic flow rate output 156. This is due to the selection of the second threshold flow rate 182 corresponding to a flow rate at which one may expect cavitation to appear in the fluid flow 106. Such cavitation can adversely affect the reliability of the ultrasonic flow rate output 156, while the bending moment flow rate output 168 remains sufficiently reliable for basing the flow rate measurement 178 on. Thus, by eliminating the ultrasonic flow rate output 156 from the determination of the flow rate measurement 178 by the controller 122, issues with the flow rate measurement caused by cavitation are substantially reduced.

Additional advantages to the use of both the ultrasonic sensor 134 and the bending moment sensor 136 include the ability to detect conditions of the fluid flow 106 and the pipe 108. Exemplary conditions of the fluid flow 106 that may be detected by the controller 122 based on the ultrasonic flow rate output 156 and/or the bending moment flow rate output 168 include entrained gas in the fluid flow 106, cavitation in the fluid flow 106, and an absence of the fluid flow 106, for example. Exemplary conditions of the pipe 108 that may be detected by the controller 122 based on the ultrasonic flow rate output 156 and/or the bending moment flow rate output 168 include a high vibration condition.

The controller 122 may detect a condition of the fluid flow 106 and/or the pipe 108 by comparing the flow rates indicated by the ultrasonic flow rate output 156 and the bending moment flow rate output 168, and issue a notification in response to the detected condition. This is particularly effective when the flow rate of the fluid flow is between the first and second threshold flow rates 180 and 182, and the vortex flowmeter 104 is operating in the medium flow mode, in which the ultrasonic flow rate output 156 and the bending moment flow rate output 168 are each normally reliable indicators of the flow rate of the fluid flow 106. For example, a condition of entrained gas or cavitation within the fluid flow 106 may be detected by the controller 122 when the bending moment flow output 168 remains relatively steady while the ultrasonic flow rate output 156 varies abnormally over time, due to the ultrasonic sensor 136 being sensitive to the entrained gas and cavitation conditions of the fluid flow 106. A high vibration pipe condition may be detected by the controller 122 when the ultrasonic flow rate output 156 remains relatively steady while the bending moment flow rate output 168 varies abnormally over time, due to the bending moment sensor being sensitive to high vibrations of the pipe 108.

Absence of liquid in the cavity 140 may be detected by analyzing the level of the signals 164 detected by the receiver 162 of the ultrasonic sensor 134, which may be indicated by the output 156. The ultrasonic waves 164 pass more efficiently through liquid than air. Thus, when the signals 164 are transmitted through air, the level of the signals 164 at the receiver 162 is lower than when the signals 164 are transmitted entirely through liquid. Thus, absence of liquid in the cavity 140 may be detected when the level of the ultrasonic signals 164 detected by the receiver 162 and indicated by the output 156 of the ultrasonic sensor 134 matches or drops below a threshold level corresponding to the absence of liquid within the cavity 140. Thus, in some embodiments, the controller 122 compares the detected level of the signals 164 indicated by the output 156 to the threshold level, and detects an absence of liquid in the cavity 140 when the detected level matches or is less than the threshold level.

The notification issued by the controller 122 may indicate the detected condition of the fluid flow 106 or the pipe 108. In some embodiments, the notification includes displaying condition information 184 relating to the detected condition, such as on a display 186 of the control unit 116, triggering of an alarm, and/or providing another type of notification. The condition information 184 may also be stored in the memory 124.

Although the embodiments of the present disclosure have been described with reference to preferred embodiments, workers skilled in the art will recognize that changes may be made in form and detail without departing from the spirit and scope of the present disclosure.

What is claimed is:

1. A vortex flowmeter configured to measure a flow rate of a fluid flow comprising:
   a housing including an interior cavity having a central axis;
   a vortex shedder supported by the housing and extending into the interior cavity along a first axis;
   an ultrasonic sensor supported by the housing on a downstream side of the vortex shedder and configured to produce an ultrasonic flow rate output that is indicative of the flow rate of the fluid flow through the interior cavity, the ultrasonic sensor including an ultrasonic emitter and an ultrasonic receiver that are positioned on opposing sides of the interior cavity;

a bending moment sensor supported by the housing on the downstream side of the vortex shedder and configured to produce a bending moment flow rate output that is indicative of the flow rate of the fluid flow through the interior cavity, the bending moment sensor including a beam extending from a wall of the interior cavity along the first axis; and a controller configured to generate a flow rate measurement that is indicative of the flow rate based on the ultrasonic flow rate output and/or the bending moment flow rate output, the controller further configured to compare the ultrasonic flow rate output with the bending moment flow rate output and detect a condition of the fluid flow or a condition of a pipe containing the fluid flow based on the comparison wherein the condition is at least one of gas entrained in the fluid flow, cavitation in the fluid flow, a high vibration condition of the pipe, and an absence of liquid condition in the pipe.

2. The vortex flowmeter of claim 1, wherein a plane extending perpendicular to the central axis extends through the beam, the ultrasonic emitter and the ultrasonic receiver.

3. The vortex flowmeter of claim 2, wherein the beam is displaced from the central axis.

4. The vortex flowmeter of claim 3, wherein a second axis, which is perpendicular to the first axis and the central axis, extends through the central axis, the ultrasonic emitter, and the ultrasonic receiver.

5. The vortex flowmeter of claim 1, wherein the vortex flowmeter includes a low flow mode when the flow rate is less than a first threshold flow rate, wherein in the low flow mode the flow rate measurement is generated by the controller based on the ultrasonic flow rate output and is not based on the bending moment flow rate output.

6. The vortex flowmeter of claim 5, wherein the vortex flowmeter includes a medium flow mode when the flow rate is between the first threshold flow rate and a second threshold flow rate, which is greater than the first threshold flow rate, wherein in the medium flow mode the flow rate measurement is generated by the controller based on the ultrasonic flow rate output and the bending moment flow rate output.

7. The vortex flowmeter of claim 6, wherein the vortex flowmeter includes a high flow mode when the flow rate is greater than the second threshold flow rate, wherein in the high flow mode the flow rate measurement is generated by the controller based on the bending moment flow rate output and is not based on the ultrasonic flow rate output.

8. The vortex flowmeter of claim 7, wherein the first threshold flow rate is less than 30 m$^3$/h.

9. The vortex flowmeter of claim 8, wherein the second threshold flow rate is greater than 80 m$^3$/h.

10. The vortex flowmeter of claim 1, wherein the controller is configured to:
compare the ultrasonic flow rate output with the bending moment flow rate output; and
detect a condition of the fluid flow or a condition of the pipe containing the fluid flow based on the comparison.

11. The vortex flowmeter of claim 10, wherein:
the fluid flow is a liquid fluid flow; and
the controller detects an entrained gas condition of the liquid fluid flow based on the comparison of the ultrasonic flow rate output and the bending moment flow rate output.

12. The vortex flowmeter of claim 10, wherein:
the fluid flow is a liquid fluid flow; and
the controller detects cavitation in the fluid flow based on the comparison of the ultrasonic flow rate output and the bending moment flow rate output.

13. The vortex flowmeter of claim 10, wherein the controller is configured to detect a high vibration condition in the pipe containing the fluid flow based on the comparison of the ultrasonic flow rate output and the bending moment flow rate output.

14. A method of measuring a flow rate of a fluid flow using a vortex flowmeter comprising:
positioning a vortex shedder of the vortex flowmeter in the fluid flow;
when the flow rate is less than a first threshold flow rate, performing a low flow mode measurement of the flow rate using an ultrasonic flow rate output produced by an ultrasonic sensor of the vortex flowmeter positioned downstream of the vortex shedder;
when the flow rate is greater than a second threshold flow rate, which is greater than the first threshold flow rate, performing a high flow mode measurement of the flow rate using a bending moment flow rate output produced by a bending moment sensor of the vortex flowmeter positioned downstream of the vortex shedder;
when the flow rate is between the first and second threshold flow rates, performing a medium flow mode measurement of the flow rate using the ultrasonic flow rate output and the bending moment flow rate output;
comparing the ultrasonic flow rate output with the bending moment flow rate output; and
detecting a condition of the fluid flow or a condition of a pipe containing the fluid flow based on the comparison wherein the condition is at least one of gas entrained in the fluid flow, cavitation in the fluid flow, a high vibration condition of the pipe, and an absence of liquid condition in the pipe.

15. The method of claim 14, wherein the first threshold flow rate is less than 30 m$^3$/h.

16. The method of claim 15, wherein the second threshold flow rate is greater than 80 m$^3$/h.

17. The method of claim 14, further comprising:
comparing the ultrasonic flow rate output with the bending moment flow rate output; and
detecting a condition of the fluid flow or a condition of a pipe containing the fluid flow based on the comparison.

18. The method of claim 17, wherein:
the fluid flow is a liquid fluid flow; and
detecting a condition of the fluid flow comprises detecting gas entrained in the fluid flow.

19. The method of claim 17, wherein:
the fluid flow is a liquid fluid flow; and
detecting a condition of the fluid flow comprises detecting cavitation in the fluid flow.

20. The method of claim 17, wherein detecting a condition of the pipe comprises detecting a high vibration condition of the pipe or an absence of liquid condition in the pipe.

21. A method of measuring a flow rate of a fluid flow using a vortex flowmeter comprising:
positioning a vortex shedder of the vortex flowmeter in the fluid flow;
when the flow rate is less than a first threshold flow rate, performing a low flow mode measurement of the flow rate using an ultrasonic flow rate output produced by an ultrasonic sensor of the vortex flowmeter positioned downstream of the vortex shedder;
when the flow rate is greater than a second threshold flow rate, which is greater than the first threshold flow rate, performing a high flow mode measurement of the flow rate using a bending moment flow rate output produced by a bending moment sensor of the vortex flowmeter positioned downstream of the vortex shedder;

when the flow rate is between the first and second threshold flow rates, performing a medium flow mode measurement of the flow rate using the ultrasonic flow rate output and the bending moment flow rate output;

wherein the first threshold flow rate is less than 30 m$^3$/h; and wherein the second threshold flow rate is greater than 80 m$^3$/h.

* * * * *